(12) United States Patent
Kim

(10) Patent No.: US 8,535,820 B2
(45) Date of Patent: Sep. 17, 2013

(54) BATTERY MODULE

(75) Inventor: Myung-Chul Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/342,895

(22) Filed: Jan. 3, 2012

(65) Prior Publication Data

US 2013/0034755 A1 Feb. 7, 2013

(30) Foreign Application Priority Data

Aug. 2, 2011 (KR) .................. 10-2011-0076950

(51) Int. Cl.
*H01M 2/10* (2006.01)
*H01M 2/12* (2006.01)

(52) U.S. Cl.
USPC .............................. 429/82; 429/99

(58) Field of Classification Search
USPC ........................... 429/157, 34, 152
See application file for complete search history.

(56) References Cited

U.S. PATENT DOCUMENTS

| 7,625,665 B2 * | 12/2009 | Jeon et al. ............ 429/157 |
| 7,858,229 B2 | 12/2010 | Shin et al. |
| 2006/0093901 A1 * | 5/2006 | Lee et al. ............ 429/120 |
| 2006/0194101 A1 | 8/2006 | Ha et al. |
| 2007/0285051 A1 | 12/2007 | Jeon et al. |
| 2007/0285052 A1 * | 12/2007 | Jeon et al. ............ 320/112 |
| 2011/0171504 A1 * | 7/2011 | Yasui et al. ............ 429/53 |

FOREIGN PATENT DOCUMENTS

| JP | 2002-042753 | 2/2002 |
| JP | 2004-281099 | 10/2004 |
| JP | 2010-287550 | 12/2010 |
| KR | 10 2007 0019839 A | 2/2007 |
| KR | 10-0717751 B1 | 5/2007 |
| KR | 10-2007-0117824 A | 12/2007 |
| KR | 10-2008-0036259 A | 4/2008 |
| WO | WO2011007532 | * 1/2011 |

OTHER PUBLICATIONS

KIPO Office action dated Oct. 24, 2012, for Korean priority Patent application 10-2011-0076950, (7 pages).

* cited by examiner

*Primary Examiner* — Patrick Ryan
*Assistant Examiner* — Christopher Domone
(74) *Attorney, Agent, or Firm* — Christie, Parker & Hales, LLP

(57) ABSTRACT

A battery module including a plurality of battery cells arranged in a direction, and a plurality of barriers, each arranged between battery cells of the plurality of battery cells and including a body unit having at least one opening and facing a face of a battery cell of the battery cells, at least one side unit connected to at least one end of the body unit such that at least a portion of the at least one side unit contacts a side of the battery cell, and at least one fixing unit on the side unit and configured to connect the barrier to an adjacent barrier of the plurality of barriers.

13 Claims, 4 Drawing Sheets

BATTERY MODULE

CROSS-REFERENCE TO RELATED APPLICATION

This application claims priority to and the benefit of Korean Patent Application No. 10-2011-0076950, filed on Aug. 2, 2011 in the Korean Intellectual Property Office, the entire content of which is incorporated herein by reference.

BACKGROUND

1. Field

Aspects of embodiments of the present invention relate to a battery module.

2. Description of the Related Art

In general, a secondary battery is a battery which can charge and discharge and can be used repeatedly. Such a secondary battery may be used in electronic devices such as cell phones, notebooks, computers, cameras, camcorders, and the like, consisting of one battery cell, for example, and may also be used as a motor-driving power source, such as in hybrid electric vehicles (HEV) and other high-power hybrid electric devices, electric vehicles (EV), and the like, as part of a battery pack including a plurality of battery cells.

In order to supplement an insulation and a radiant heat between battery cells, and low mechanical strength of the battery cell, a barrier is generally provided between battery cells constituting the battery module. However, in conventional techniques, an electrical insulation property may not be adequate since a conventional barrier consisting mainly of metallic materials is disposed facing sides of the battery cells.

SUMMARY

According to an aspect of embodiments of the present invention, a battery module has an improved insulation property.

According to an embodiment of the present invention, a battery module includes: a plurality of battery cells arranged in a direction, and a plurality of barriers, each arranged between battery cells of the plurality of battery cells and including a body unit having at least one opening and facing a face of a battery cell of the battery cells, at least one side unit connected to at least one end of the body unit such that at least a portion of the at least one side unit contacts a side of the battery cell, and at least one fixing unit on the side unit and configured to connect the barrier to an adjacent barrier of the plurality of barriers.

The at least one fixing unit may include a body unit connected to an end of the at least one side unit or a boundary of the at least one side unit, and a fixing member connectable with the at least one fixing unit of the adjacent barrier.

The fixing member may be extended from the body unit and may be stepped relative to the body unit.

The at least one fixing unit may include a through hole.

The battery module may further include a connecting bar, and the at least one fixing unit of the adjacent barrier may be connected by the connecting bar passing through the through hole.

The body unit may include a linear member between openings of the at least one opening.

The at least one side unit may include a first side member and a second side member connected to opposite sides of the linear member, respectively, and a third side member and a fourth side member connected between the first side member and the second side member.

At least one of the first, second, third, or fourth side members may include a gas outlet corresponding to a vent unit of the battery cell.

The at least one of the first, second, third, or fourth side members may further include a barrier surrounding a circumference of the gas outlet.

At least one of the first, second, third, or fourth side members may include a terminal outlet corresponding to a terminal of the battery cell.

In one embodiment, the barrier accommodates the battery cell at one side of the body unit, and the body unit is connected to a side edge of the at least one side unit.

In one embodiment, the barrier accommodates the battery cell at one side of the body unit and accommodates another battery cell of the battery cells at another side of the body unit opposite the one side, and the body unit is connected to an inner surface of the at least one side unit contacting the battery cell.

The battery module may further include a first end plate and a second end plate arranged at opposite outer sides of the plurality of battery cells.

The first end plate and the second end plate may include connecting units fixed with the connecting bar, respectively.

The connecting bar and the connecting units may be fixed by connecting members.

The barrier may include a non-electroconductive plastic or metallic material.

As described above, according to an aspect of embodiments of the present invention, a battery module has an excellent insulation property by accommodating a battery cell into a barrier formed of a non-electroconductive plastic or metallic material. As such, a rechargeable battery according to embodiments of the present invention is suited for use as a motor-driving power source for propelling electric scooters, hybrid vehicles, or electric vehicles.

According to another aspect of embodiments of the present invention, a battery module includes the connection bar capable of connecting the plurality of adjacent barriers, and since the battery cells can be easily aligned, an assembly property of the battery module is improved.

BRIEF DESCRIPTION OF THE DRAWINGS

The accompanying drawings, together with the specification, illustrate some exemplary embodiments of the present invention, and, together with the description, serve to explain aspects and principles of the present invention.

DETAILED DESCRIPTION

Figure 1:
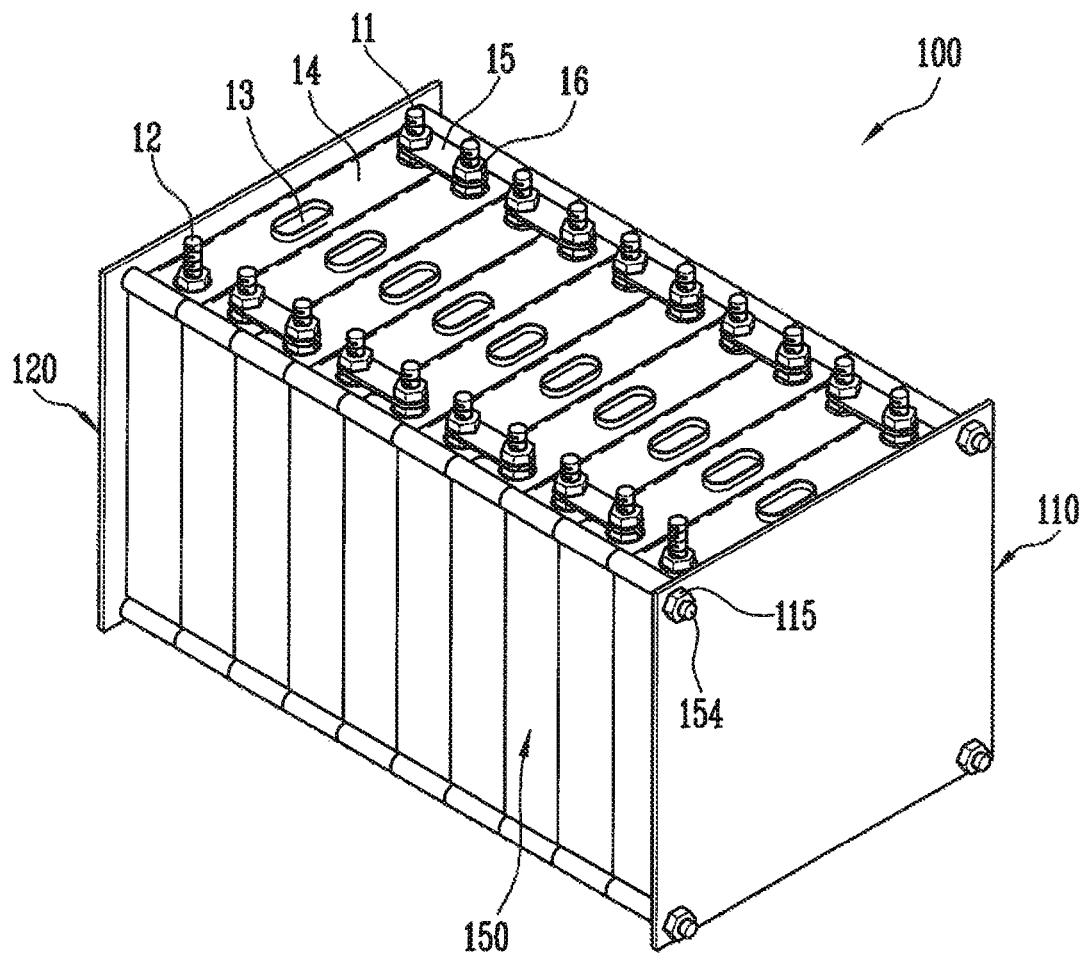
FIG. 1 is a schematic perspective view of a battery module according to an embodiment of the present invention.

In the following detailed description, certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or may be indirectly on the another element with one or more intervening elements interposed therebetween. Also, when an element is referred to as being "connected to" another element, it can be directly connected to the another element or may be indirectly connected to the another element with one or more intervening elements interposed therebetween. Hereinafter, like reference numerals refer to like elements.

Specific features or components of embodiments of the present invention described herein and shown in the drawings may be interchangeable or substituted in other embodiments of the present invention.

Embodiments of the present invention are described herein with reference to the accompanying drawings.

Figure 2:
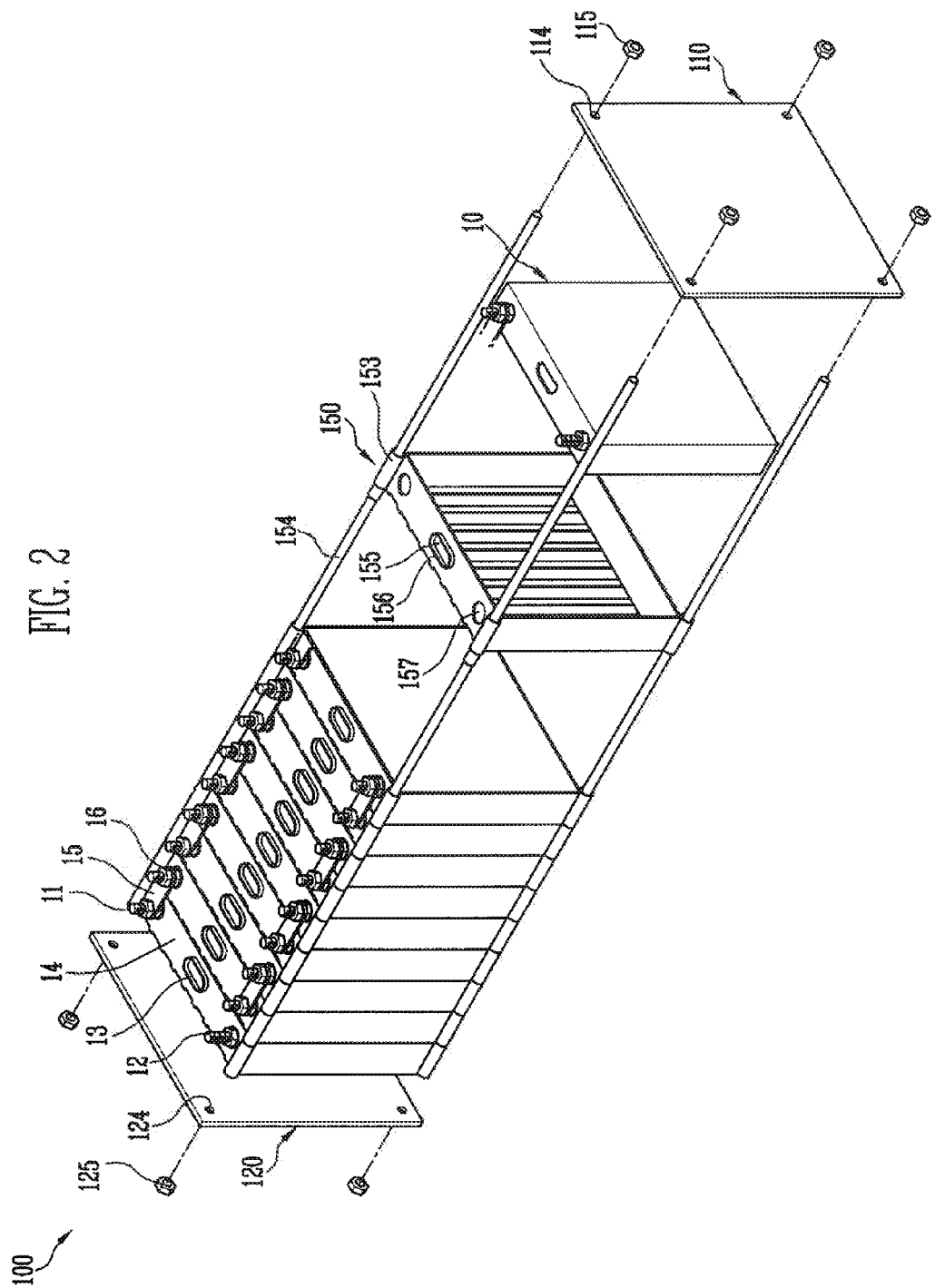
FIG. 2 is an exploded perspective view of the battery module of FIG. 1.
Figure 3A:
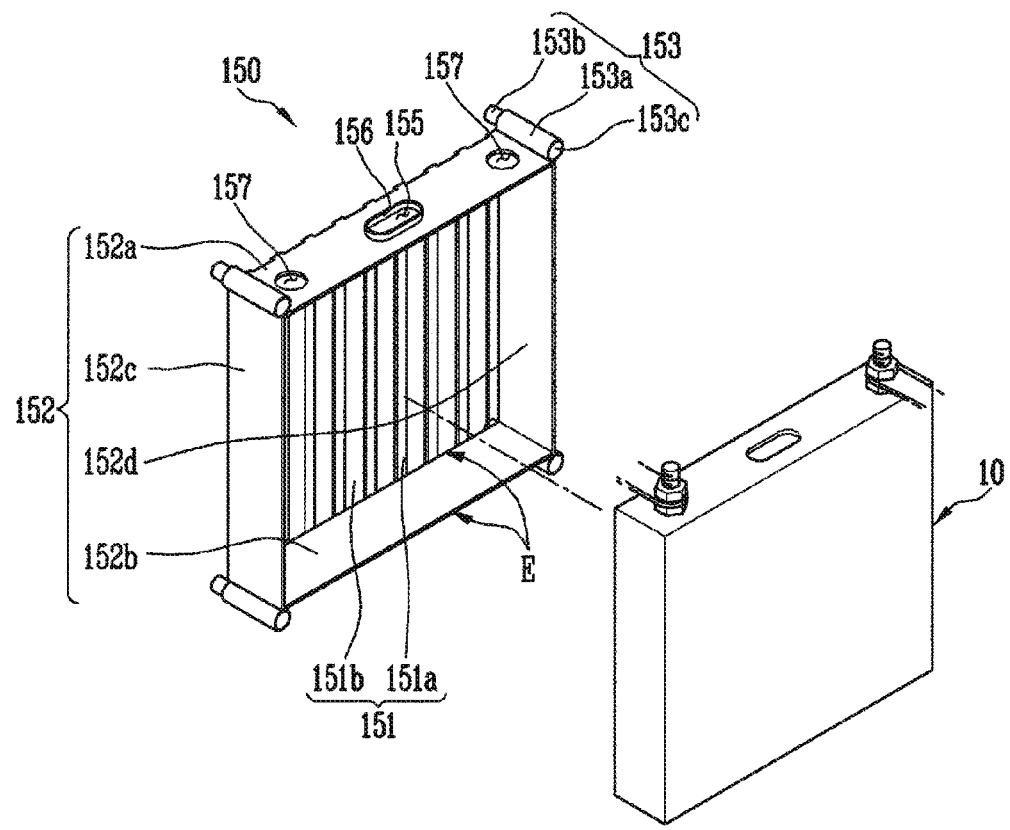
FIG. 3A is an exploded perspective view of a barrier and a battery cell of the battery module of FIG. 1.
Figure 3B:
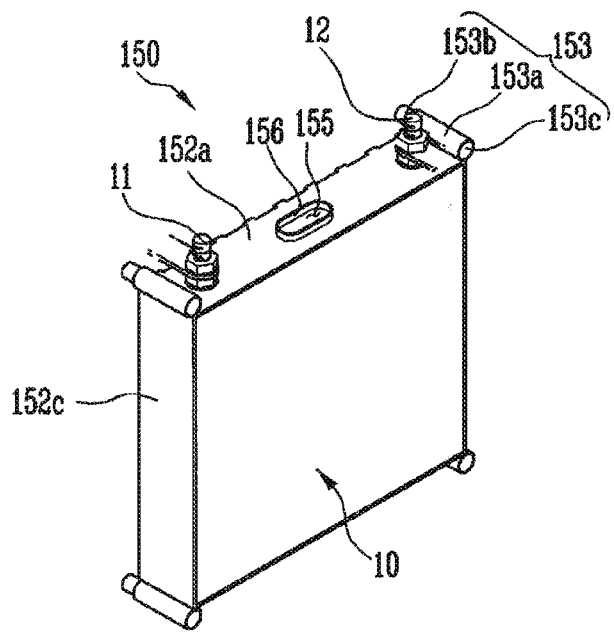
FIG. 3B is a perspective view showing the barrier and the battery cell of FIG. 3A in a combined state.
Figure 4A:
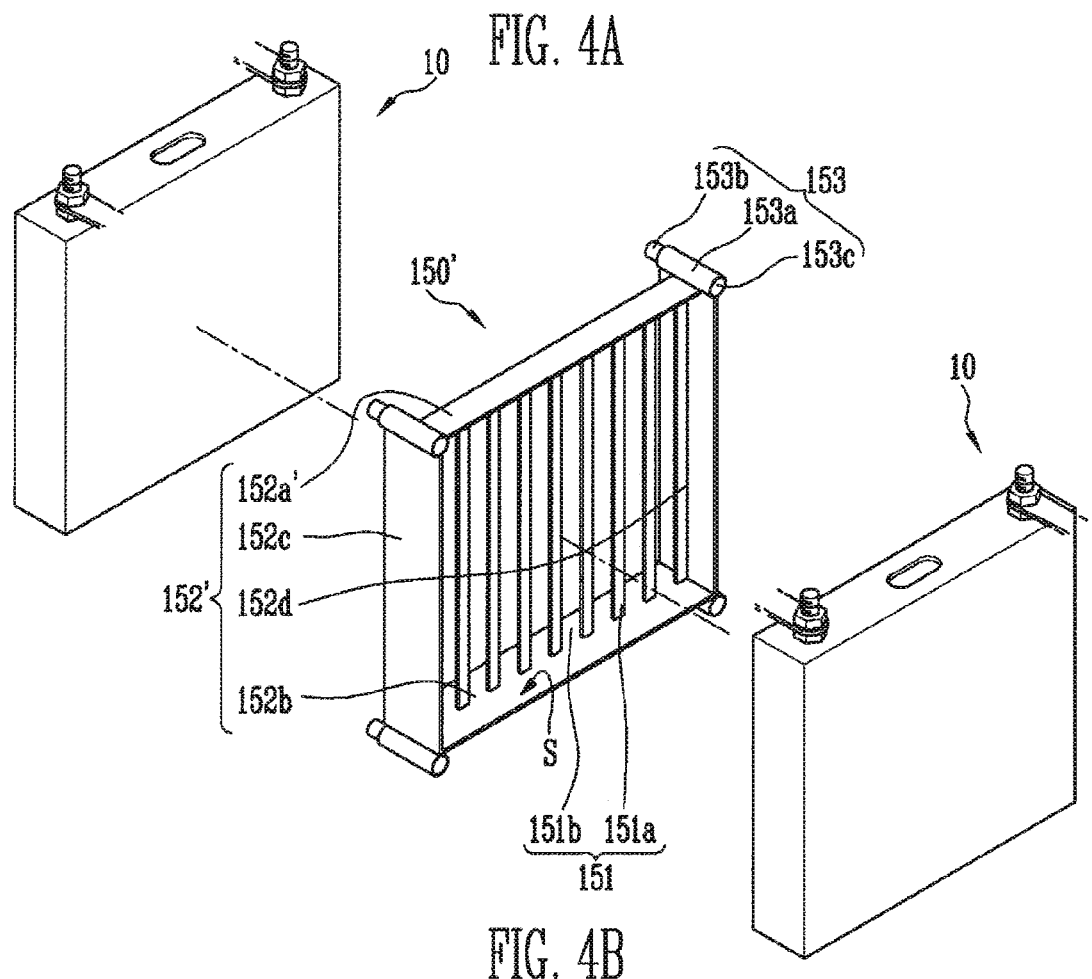
FIG. 4A is an exploded perspective view of a barrier and two battery cells according to another embodiment of the present invention.
Figure 4B:
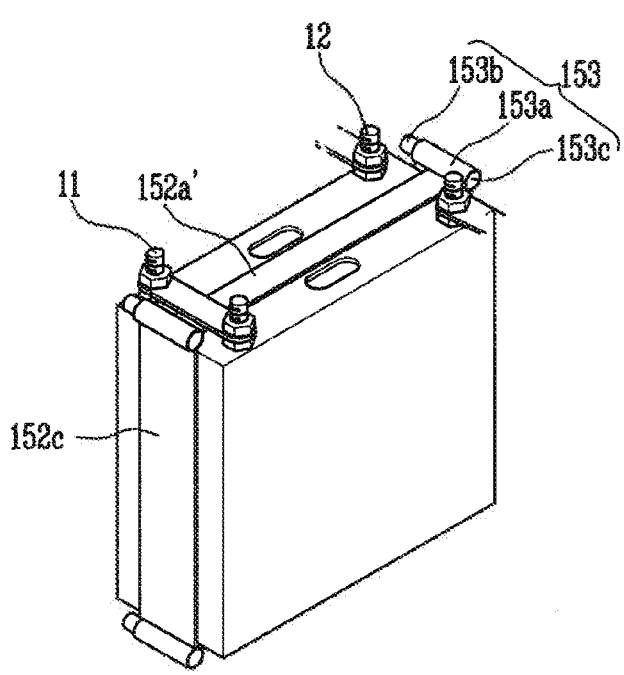
FIG. 4B is a perspective view showing the barrier and the battery cells of FIG. 4A in a combined state.

FIG. 1 is a schematic perspective view of a battery module according to an embodiment of the present invention; FIG. 2 is an exploded perspective view of the battery module of FIG. 1; FIG. 3A is an exploded perspective view of a barrier and a battery cell of the battery module of FIG. 1; FIG. 3B is a perspective view showing the barrier and the battery cell of FIG. 3A in a combined state; FIG. 4A is an exploded perspective view of a barrier and two battery cells according to another embodiment of the present invention; and FIG. 4B is a perspective view showing the barrier and the battery cells of FIG. 4A in a combined state.

Referring to FIGS. 1 to 3B, according to an embodiment of the present invention, a battery module 100 includes a plurality of battery cells 10 arranged in a direction and barriers 150 interposed between the battery cells 10. In one embodiment, each of the barriers 150 includes a body unit 151 facing a longitudinal face of one of the battery cells 10 and having one or more linear members 151a and at least one opening 151b. The barrier 150 further includes at least one side unit 152 at one or more ends of the barrier 150 and contacting at least a portion of one end side of the battery cell 10, and at least one fixing unit 153 provided at the side unit 152 to connect adjacent barriers 150 to one another.

The fixing units 153 of the adjacent barriers 150 are fixed and connected with each other, and, in one embodiment, each of the fixing units 153 includes a body unit 153a connected to an end of the side unit 152 or a boundary of the side unit 152, and a fixing member 153b configured to connect with the fixing unit 153 of the adjacent barrier 150.

The fixing member 153b, in one embodiment, is extended from the body unit 153a and has a step difference with, or is stepped relative to, the body unit 153a in order to connect with the adjacent barrier 150. In one embodiment, the fixing units 153 further include through holes 153c, and the fixing units 153 of the adjacent barriers 150 are connected by a connecting bar 154 provided to pass through the through holes 153c.

In one embodiment, the body unit 151 facing the longitudinal face of the battery cell 10 includes the one or more linear members 151a and the at least one of the openings 151b located between the linear members 151a. The openings 151b may function as passages for discharging the heat, such that the heat generated from the battery cells 10 during the repeated discharge or charge is not accumulated, for example. In addition, the openings 151b may function as passages of a heat transfer medium for cooling or heating the battery cells 10. That is, the heat transfer medium may be introduced into one side of the battery module 100 to heat-exchange by directly facing the longitudinal faces of the battery cells 10 while passing through the openings 151b provided in the barriers 150. Further, the heat transfer medium may be discharged at the opposite side to maintain the battery cells 10 at or about a temperature (e.g., a predetermined temperature).

The at least one side unit 152, which is connected to the body unit 151 to contact at least one side of the battery cell 10, may include a first side member 152a and a second side member 152b connected to opposite sides of the linear member 151a, respectively, and a third side member 152c and a fourth side member 152d connected between the first side member 152a and the second side member 152b, such as at opposite ends thereof.

In one embodiment, the first side member 152a includes a gas outlet 155 corresponding to a vent unit 13 of the battery cell 10. In addition, the circumference of the gas outlet 155 may have a barrier 156 surrounding the gas outlet 155. Since the vent unit 13 is a passage discharging gas from the battery cell 10, the gas outlet 155 is preferably formed so as to not obstruct the vent unit 13, and the barrier 156 is formed to guide the discharged gas to be discharged away from the battery cell 10, such that the battery cell 10 is not affected by the discharged gas. In one embodiment, the first side member 152a includes terminal outlets 157 corresponding to a cathode terminal 11 and an anode terminal 12, respectively, of the battery cell 10.

According to an embodiment of the present invention, an excellent insulation property can be implemented by accommodating the battery cell 10 into the barrier 150 formed of a non-electroconductive plastic or metallic material.

In one embodiment, the battery module 100 is provided with a connection bar 154 for connecting the plurality of adjacent barriers 150, such that the battery cells 10 can be easily aligned and a process of assembling the battery module 100 can be improved.

Referring to FIGS. 3A and 3B, according to an embodiment of the present invention, when the barrier 150 accommodates the battery cell 10 in one direction of the body unit 151, the body unit 151 may be provided so as to be connected to a side edge E of the side unit 152. In this embodiment, the barriers 150 correspond to the battery cells 10 one-to-one, that is, each of the barriers 150 accommodates one battery cell 10.

In one embodiment, the first side member 152a includes the gas outlet 155 corresponding to the vent unit 13 of the battery cells 10, and the circumference of the gas outlet 155 is further provided with the barrier 156 surrounding the gas outlet 155. In one embodiment, the first side member 152a includes the terminal outlets 157 corresponding to the cathode terminal 11 and the anode terminal 12 of the battery cell 10, respectively.

Referring to FIGS. 4A and 4B, according to another embodiment of the present invention, a barrier 150' accommodates two battery cells 10 in both directions of the body unit 151, and the body unit 151 is connected with an inside surface S of a side unit 152' of the barrier 150' that contacts with the two battery cells 10. The barrier 150' corresponds to two battery cells 10, and one barrier 150' accommodates a portion of the two battery cells 10. A remaining portion of one of the two battery cells 10 that is not accommodated in the barrier 150' (see FIG. 4B) may be accommodated by an adjacent barrier 150' in one direction, and a remaining portion of the other of the two battery cells 10 that is not accommodated in the barrier 150' (see FIG. 4B) may be accommodated by an adjacent barrier 150' in another direction.

In the barrier 150' shown in FIGS. 4A and 4B, a first side member 152a' of the side unit 152' is provided with a shape of a thin strip between the vent units 13 of two adjacent battery cells 10 accommodated by the barrier 150' such that the vent units 13 are not overlapped with the cathode terminal 11 and the anode terminal 12.

In the battery cell 10 according to one embodiment, after an electrode assembly and an electrolyte solution are accommodated in a cell case, the battery cell 10 can be prepared by sealing the cell case by a cap plate 14. The cap plate 14 may include the anode terminal 11 and the cathode terminal 12 provided at opposite ends on the cap plate 14, and a vent 13 provided between the anode terminal 11 and the cathode terminal 12. The electrode assembly may include an anode plate and a cathode plate, and a separator interposed between the anode plate and the cathode plate. The anode plate is connected to the anode terminal 11, and the cathode plate is connected to the cathode terminal 12, such that energy generated by an electrochemical reaction of the electrode assembly and the electrolyte solution is transferred to the outside. The vent 13 may function as a passage discharging gas generated from the inside of the battery cell 10 to the outside.

The battery module 100 may include a pair of a first end plate 110 and a second end plate 120 disposed at the outside of the battery cells 10, and the first end plate 110 and the second end plate 120 may include connecting units 114 and 124 fixed with the connecting bar 154, respectively. Further, in one embodiment, the connecting bar 154 and the connecting units 114 and 124 may be fixed by connecting members 115 and 125.

The first end plate 110 and the second end plate 120 may divide a predetermined space in order to accommodate the plurality of battery cells 10, and the battery cells 10 may be arranged and provided in the divided space in one direction. In one embodiment, the battery cells 10 are arranged side by side to face one another such that wide longitudinal side faces are facing each other. The anode terminal 11 or the cathode terminal 12 of two adjacent battery cells 10 may be electrically connected with each other through a bus bar 15. The bus bar 15 may be provided with a hole which may be penetrated by the anode terminal 11 and the cathode terminal 12, and the anode terminal 11 and the cathode terminal 12 are penetrated through the hole, and accordingly, the bus bar 15 connected through the hole may be fixed by a member such as a nut 16.

The first end plate 110 and the second end plate 120 are arranged to contact the barriers 150 provided at both ends, respectively, and accordingly the polarity of battery cells 10 may be pressed into the inside. In one embodiment, the battery cells 10, which are supported by the first end plate 110 and the second end plate 120, are arranged to be alternately disposed with each other, such that the adjacent terminals can be connected in series.

The first end plate 110 and the second end plate 120 described above are configured to securely fix the battery cells 10. However, embodiments of the present invention are not limited thereto and may be modified in various different ways. Also, connection structures of the battery cells 10 and the number of the battery cells 10 may be modified in various ways according to the design of the battery module 100.

In one embodiment, when a gas pressure generated inside of the battery cell 10 is higher than a certain pressure (e.g., a predetermined pressure), the vent unit 13 functions as a passage for gas to be discharged from the battery cell 10, and the vent unit 13 may thereby prevent or substantially prevent the battery cell 10 from breaking or exploding due to the pressure.

According to embodiments of the present invention, an excellent insulation property can be implemented by accommodating the battery cell into a barrier formed of non-electroconductive plastic or metallic materials. As such, a rechargeable battery according to embodiments of the present invention is suited for use as a motor-driving power source for propelling electric scooters, hybrid vehicles, or electric vehicles.

In addition, the battery module according to embodiments of the present invention includes the connection bar for connecting the plurality of adjacent barriers, and since the battery cells can be easily aligned, an assembly property of the battery module is improved.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A battery module comprising:
a plurality of battery cells arranged in a direction;
a plurality of barriers, each arranged between battery cells of the plurality of battery cells and comprising:
a body unit having at least one opening and facing a face of a battery cell of the battery cells;
at least one side unit connected to at least one end of the body unit such that at least a portion of the at least one side unit contacts a side of the battery cell; and
at least one fixing unit on the side unit and configured to connect the barrier to an adjacent barrier of the plurality of barriers,
wherein the at least one fixing unit comprises a body unit connected to an end of the at least one side unit or a boundary of the at least one side unit, and a fixing member connectable with the at least one fixing unit of the adjacent barrier,
wherein the fixing member is extended from the body unit and is stepped. relative to the body unit, and
wherein the at least one fixing unit includes a through hole; and
a connecting bar, wherein the at least one fixing unit of the adjacent barrier is connected by the connecting bar passing through the through hole.

2. The battery module according to claim 1, further comprising a first end plate and a second end plate arranged at opposite outer sides of the plurality of battery cells.

3. The battery module according to claim 2, wherein the first end plate and the second end plate include connecting units fixed with the connecting bar respectively.

4. The battery module according to claim 3, wherein the connecting bar and the connecting units are fixed by connecting members.

5. The battery module according to claim 1, wherein the body unit includes a linear member between openings of the at least one opening.

6. The battery module according to claim 5, wherein the at least one side unit includes a first side member and a second side member connected to opposite sides of the linear member, respectively, and a third side member and a fourth side member connected between the first side member and the second side member.

7. The battery module according to claim 6, wherein at least one of the first, second, third, or fourth side members includes a gas outlet corresponding to a vent unit of the battery cell.

8. The battery module according to claim 7, wherein the at least one of the first, second, third, or fourth side members further includes a barrier surrounding a circumference of the gas outlet.

9. The battery module according to claim 6, wherein at least one of the first, second, third, or fourth side members includes a terminal outlet corresponding to a terminal of the battery cell.

10. The battery module according to claim 1, wherein the barrier accommodates the battery cell at one side of the body unit, and the body unit is connected to a side edge of the at least one side unit.

11. The battery module according to claim 1, wherein the barrier accommodates the battery cell at one side of the body unit and accommodates another battery cell of the battery cells at another side of the body unit opposite the one side, and the body unit is connected to an inner surface of the at least one side unit contacting the battery cell.

12. The battery module according to claim 1, wherein the barrier comprises a non-electroconductive plastic or metallic material.

13. The battery module according to claim 1, wherein the battery module is adapted for use as a motor-driving power source for propelling an electric vehicle or a hybrid electric vehicle.

* * * * *

UNITED STATES PATENT AND TRADEMARK OFFICE
CERTIFICATE OF CORRECTION

| | | |
|---|---|---|
| PATENT NO. | : 8,535,820 B2 | Page 1 of 1 |
| APPLICATION NO. | : 13/342895 | |
| DATED | : September 17, 2013 | |
| INVENTOR(S) | : Myung-Chul Kim | |

It is certified that error appears in the above-identified patent and that said Letters Patent is hereby corrected as shown below:

On the Title Page

(74) Attorney, Agent, or Firm, line 1    Delete "Hales,"

Insert -- Hale, --

In the Claims

Column 6, Claim 1, line 38    Delete "stepped,"

Insert -- stepped --

Signed and Sealed this
Twenty-sixth Day of May, 2015

Michelle K. Lee
*Director of the United States Patent and Trademark Office*